United States Patent [19]

Hahm et al.

[11] 4,440,437
[45] Apr. 3, 1984

[54] OPERATOR ENCLOSURE MOUNTING FOR A SELF-PROPELLED HARVESTER

[75] Inventors: Gunter Hahm, Kleinbundenbach; Klaus Pauli, Homburg-Einod; Walter Schleicher, Swisttal, all of Fed. Rep. of Germany

[73] Assignee: Deere & Company, Moline, Ill.

[21] Appl. No.: 379,414

[22] Filed: May 18, 1982

[30] Foreign Application Priority Data

May 22, 1981 [EP] European Pat. Off. ........ 81103938.7

[51] Int. Cl.³ ............................................. B62D 33/06
[52] U.S. Cl. .................................. 296/190; 180/89.13
[58] Field of Search ...................... 296/35.1, 190, 1 F, 296/89.17, 89.18, 190; 180/89.12–89.15; D15/26, 30, 33

[56] References Cited

U.S. PATENT DOCUMENTS

| Re. 29,123 | 1/1977 | Malm et al. | 296/35 R |
|---|---|---|---|
| 2,709,105 | 5/1955 | Kramer | 296/1 F |
| 3,737,192 | 6/1973 | Hirsch | 296/190 |
| 3,851,913 | 12/1974 | Knoth | 296/35 R |
| 3,954,150 | 5/1976 | Cole et al. | 180/89 R |
| 3,990,737 | 11/1976 | Palmer | 296/35 R |
| 4,066,058 | 1/1978 | Anderkay | 123/298 E |
| 4,067,531 | 1/1978 | Sikula | 248/358 R |

FOREIGN PATENT DOCUMENTS

| 1555390 | 10/1970 | Fed. Rep. of Germany | 296/190 |
|---|---|---|---|
| 2164411 | 7/1972 | Fed. Rep. of Germany | |
| 2089612 | 7/1972 | France | |
| 2291897 | 7/1976 | France | |
| 140663 | 3/1980 | German Democratic Rep. | 296/190 |
| 2024113 | 1/1980 | United Kingdom | 180/89.14 |

Primary Examiner—Robert B. Reeves
Assistant Examiner—Dennis H. Pedder

[57] ABSTRACT

The operator enclosure for a self-propelled combine harvester is mounted on the combine body by a plurality of resilient mountings. The bottom of the enclosure is open so that when mounted on the combine, it encloses a floor space. This floor space is covered by a noise and vibration insulating material which extends to meet and partially support the walls of the enclosure. The floor covering and insulating element absorbs noise emanating directly from the combine body as well as contributing to the vibration isolating support of the enclosure itself. A forward pair of resilient mountings are arranged so that, pivoting on them, the enclosure can be tilted forward for improved access to the combine control area for adjustment and repair.

4 Claims, 4 Drawing Figures

OPERATOR ENCLOSURE MOUNTING FOR A SELF-PROPELLED HARVESTER

BACKGROUND OF THE INVENTION

This invention concerns operator enclosures for vehicles such as self-propelled crop harvesters and, more particularly, mounting and insulating arrangements for the operator enclosure of such a machine.

Unitary operator enclosures or cabs for self-propelled vehicles are well-known; see, for example, U.S. Pat. No. Re. 29,123 also assigned to the assignee of the present invention. In these the enclosure, consisting of upright walls and a roof, is typically attached to the vehicle by resilient mountings so as to isolate it from vibrations. Such enclosures improve operator environment in terms of atmosphere, noise and vibration, but noise and vibration levels may still be undesirably high because of transmissions into the enclosure by the portions of the vehicle structure contained within it.

SUMMARY OF THE INVENTION

Accordingly, it is an object of the invention to reduce still further the noise and vibration levels at the operator's station of an off-highway vehicle such as a self-propelled harvester, below those which result from the use of a conventional operator enclosure in which at least one opening communicates directly with portions of the vehicle frame or body.

According to the invention, at least one insulating element for absorbing vibration and noise emanating from portions of the vehicle enclosed by the operator station enclosure supplements the resilient mounts which support the operator enclosure on the vehicle. It is a feature of the invention that the additional insulating element be designed with a large surface so as to absorb sound and vibrations and reduce to a minumum the contribution of the enclosed portions of the vehicle to the noise level and vibrations at the operator station. Preferably, the large surface insulating element is in the form of a mat covering at least a principal horizontal floor portion of the enclosure and engaging the walls of the enclosure so as to contribute to its support. The additional insulating element may be secured to the vehicle body independently of the enclosure assembly so that it becomes possible to mount or remove the enclosure independently of the insulating element.

When a unitary type of enclosure, open at the bottom, is combined with an insulating element substantially entirely covering the vehicle external surfaces enclosed within the enclosure, the operator station becomes substantially completely surrounded with insulating elements. Sharing of support of the enclosure between a mat-like insulating element and conventional resilient supports gives good insulation of the enclosure. When the enclosure is mounted independently of the additional surface covering insulating element, it also becomes more feasible to offer the vehicle for sale optionally with or without the enclosure, especially when the enclosure may be attached or removed without disturbing the operator controls.

Further, the enclosure may be mounted so that at least one of its resilient mountings or possibly a pair may serve as a hinge along one side of the enclosure so that it may be tilted to provide improved access for service, repair or adjustment. On a harvester, it is generally convenient if the enclosure tilts forward and the opening at the base and rear of the enclosure may be arranged so that all controls etc. are cleared and need not be disturbed.

DESCRIPTION OF THE PREFERRED EMBODIMENT

Figure 1:
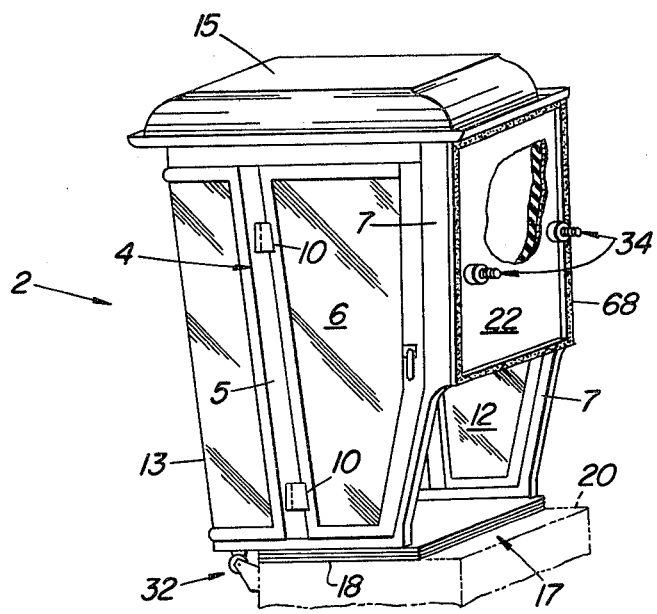
FIG. 1 is a left-hand rear three-quarter perspective somewhat schematic representation of an operator station enclosure for a combine harvester embodying the invention.
Figure 2:
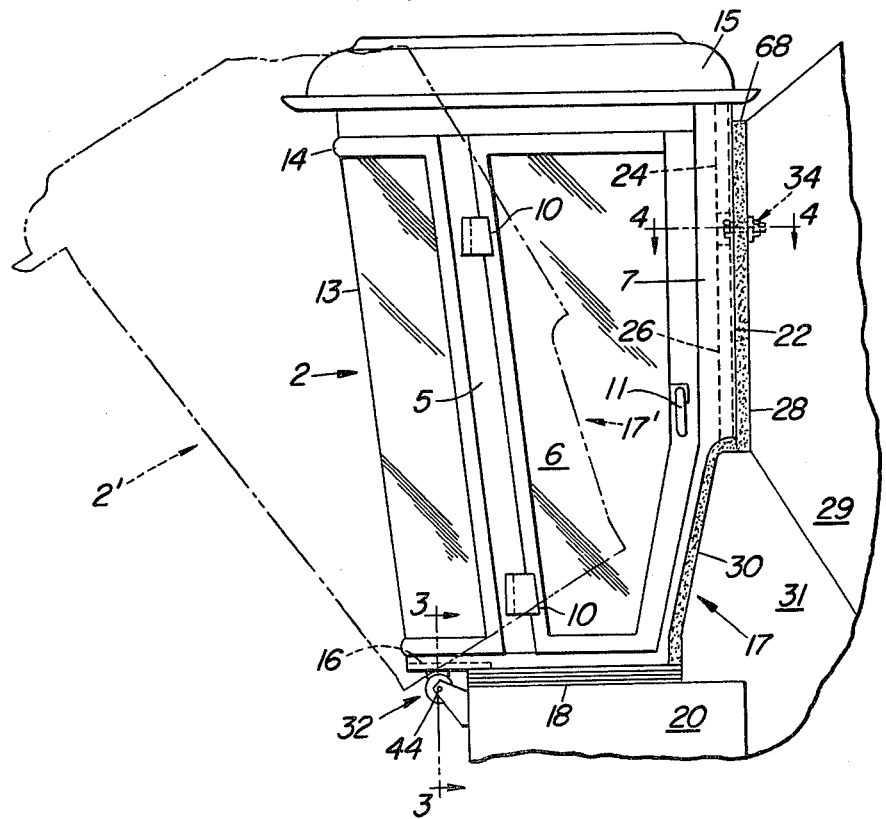
FIG. 2 is an enlarged left-hand side view of the operator enclosure.

The invention is embodied in an operator enclosure for a self-propelled harvester and is shown in general arrangement in FIGS. 1 and 2. For convenience in the remainder of the description, the embodiment will be assumed to be the operator enclosure of a typical self-propelled combine harvester, a representative of the off-the-road vehicle group to which the invention is particularly adaptable. The general configuration and structure of combine harvesters is well known and only these portions of the machine immediately adjacent to and providing support for the operator enclosure need be mentioned in this description of an exemplary embodiment.

The frame structure 4 of the operator enclosure 2 includes a door post 5 and opposite rear upright members 7. A door 6 is hinged to the post 5 by way of hinges 10 and comprises the major portion of the left-hand side wall of the enclosure. The door is close fitting and when closed, is essentially sealed by a conventional gasket arrangement (not shown) and is secured by a conventional latch 11. A similar door 12 may be fitted in the right-hand side wall of the enclosure. A full height, wraparound windshield 13 with a surrounding seal 14 is securely mounted and secured into the frame structure and forms a forward wall for the enclosure. The enclosure roof structure 15 may, as is conventional, accommodate a cabin atmosphere control unit but this is not shown.

Principal vertical support for the enclosure 2 comes from the operator's platform or pedestal 20 of the combine harvester. The base of the enclosure extends forwardly somewhat beyond the pedestal 20 and a forward floor extension 16 seals the space between the forward upright enclosure wall (windshield 13 in frame 4) and the pedestal 20 as indicated in FIG. 2. The enclosure assembly 2 has a bottom opening 17 defined by the lower edges of the walls of the frame structure 4 and the rearward edges of floor portion 16. The perimeter of the opening 17 is contiguous with the combine structure and is seated partially on an insulating floor mat 18. The mat 18 serves as a floor insulating element to absorb noise and vibration and it may be made of rubber or some other suitable insulating material. The mat 18 extends so that the horizontal portion of the bottom opening 17 of the enclosure, where it overlies the pedestal 20, is completely covered and insulated and so that it underlies the enclosure walls and provides part of the support for the enclosure.

The rear portion of the enclosure 2 includes an upper rear wall 22 which is integrated into the enclosure structure 4 so that the entire upper portion of the structure is weather-tight. This portion may be completely lined on its inner side by a mat-like insulating element comprising contiguous upper and lower portions, 24 and 26 respectively. The rear wall 22 substantially coincides with a forward wall 28 of the grain tank 29 of the combine. The final closure of the operator enclosure 2, in mounting it on the combine harvester, is made by a further mat-like insulating member 30, attached to an upright wall portion portion of the combine body structure 31 and which also extends so that the enclosure frame structure 4 bears upon it. Alternatively, this portion of the opening 17 may be gasketed around its edges by a gasket or sealing strip (not shown). The insulating element 30 may be made in one piece with the mat 18, or preferably, is at least connected with it.

Figure 3:
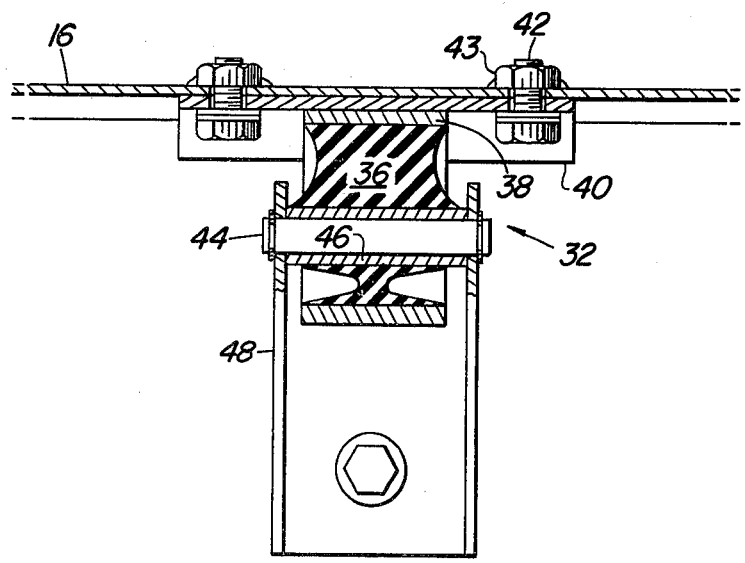
FIG. 3 is an enlarged partial, sectional view of a forward mounting element of the enclosure taken approximately along line 3—3 of FIG. 2.

The enclosure 2 is connected to the combine body structure (pedestal 20, tank wall 28) by resilient mounting assemblies 32 and 34 respectively. The forward lower pair of mounting assemblies 32 are symmetrically spaced at the front of the enclosure beneath the windshield 13 forward of and no higher than the horizontal floor portion of pedestal 20. As shown in FIG. 3, each includes a rubber element 36 bonded into a metal box 38 attached rigidly to a U-form support 40 attached to the underside of the floor extension 16 by bolts and nuts, 42 and 43 respectively. This resilient mounting 32 may pivot about a transverse axis on a pivot pin 44 passing through a bushing 46 in the rubber element 36 and engaging the holes of a pivot bracket 48, rigidly connected to the vehicle structure (operator station pedestal 20).

Figure 4:
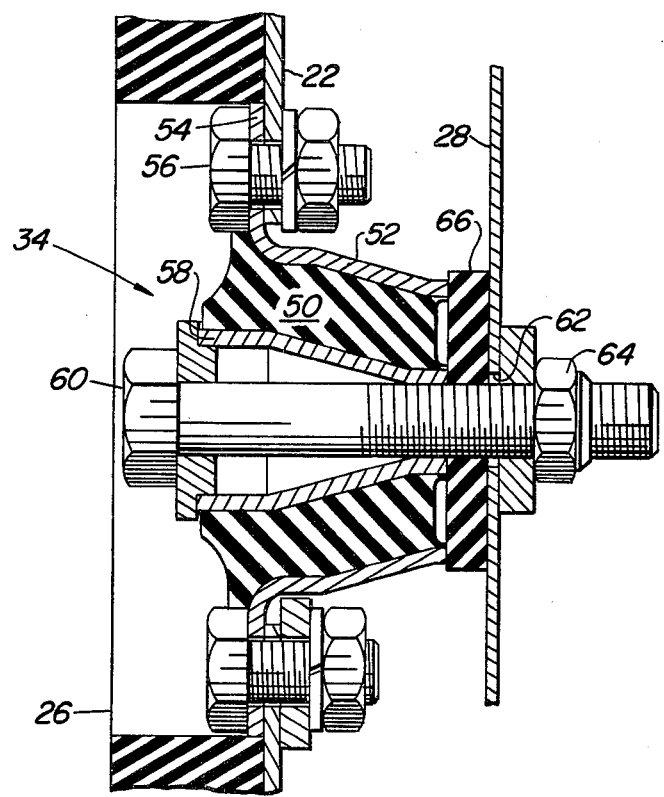
FIG. 4 is an enlarged partial, sectional view of a rearward mounting element of the enclosure taken approximately on line 4—4 of FIG. 2.

The rearward attachment of the operator enclosure 2 to the combine structure is made by another pair of resilient mountings 34 as shown in some detail in FIG. 4. These mountings are spaced vertically substantially above the transverse axis of mounting assemblies 32 and comprise an annular rubber member 50 contained in a frusto-conical metal box 52, the box 52 having an annular flange 54 by which it is secured to the enclosure rear wall 22 by bolts 56. The mounting includes a central core 58 and coupling to the combine structure is completed by a threaded fastener such as bolt 60 passing through the core 58 and hole 62 in the tank wall 28 and secured by nut 64. A rubber washer 66 between the wall 28 and housing 52 and core 58 helps to further insulate and stabilize the connection in which the enclosure rear wall 22 is spaced from the tank wall 28. A gasket 68 may surround the rear wall 22 to provide further insulation from the combine body. As can be seen from FIG. 2, the tightening of the nuts 64 on bolts 60 will bias the enclosure 2 generally rearward, pivoting on the axis of the pivot pin 44, to complete the rearward and downward movement of the perimeter of the enclosure bottom opening 17 into contact with the insulating element portions 18 and 30.

When the rear of the operator enclosure 2 is released by loosening bolts 60 and nuts 64, the enclosure can be tilted forward, pivoting on the coaxial pins 44 of the front resilient mountings 32, as indicated at 2' and 17' in FIG. 2. This action uncovers the operator station for improving access for adjustment and repair of, for example, control elements (not shown) housed in the operator enclosure and possibly mounted on or passing through no structure covered by the insulating elements 18 and 30. The forward mounting elements 32 thus have a dual function—resilient mounting and pivot.

It will be seen that an operator enclosure according to the invention, having a floor insulating element or elements independent of its unitary wall structure, makes it convenient to deliver the combine either with or without the enclosure 2. The enclosure may be mounted or dismounted without the need to interfere with equipment carried by the combine structure within the enclosure.

Overall, compared with conventional enclosures, the design provides improved noise and vibration insulation and the conveniences of a tiltable and easily mounted and dismounted enclosure.

We claim:

1. In a self-propelled harvester having an operator station defined in part by harvester body structure portions including an approximately horizontal floor portion and a generally upright wall portion rearward and upward of and contiguous with the floor portion and including an operator enclosure having a frame and generally upright front and rear walls and opposite side walls and a downwardly and rearwardly facing bottom opening having a perimeter defined by lower portions of said walls and shaped to mate with the body floor and body upright wall portions so as to enclose the operator station, said enclosure rear wall extending above the body structure upright wall portion and adjacent a further body structure portion, a mounting arrangement for the enclosure comprising:

a plurality of spaced apart resilient mountings connecting the enclosure to the harvester body structure, including at least one rear mounting connected to a rearward upright portion of the enclosure and at least one forward mounting disposed adjacent a lower portion of the front wall, said forward mounting including means permitting forward pivoting of the operator enclosure about a horizontal lateral axis passing through said mounting so that the enclosure may be pivoted forward to expose the operator station; and a mat-like insulating element carried by the body structure and interposed between the perimeter of the enclosure bottom opening and the harvester body structure for minimizing the noise and vibration transmitted into the operator station from the harvester body structure said element covering entirely the harvester body structure portions enclosed by the enclosure, and meeting and at least partially underlying substantially the entire perimeter of the enclosure bottom opening and sharing in the support of the enclosure.

2. The mounting arrangement of claim 1 and further including a second mat-like insulating element carried by and substantially covering the enclosure rear wall and wherein the rear resilient mounting connects the enclosure rear wall to the further body structure portion.

3. The mounting arrangement of claim 2 wherein the further body structure portion comprises a grain tank wall and the rear resilient mounting includes means for spacing the enclosure rear wall from the tank wall.

4. The mounting arrangement of claim 1 wherein the pivot axis of the front mounting is disposed forward of and no higher than the horizontal floor portion and wherein the mounting connected to the rearward upright portion of the enclosure is spaced vertically above said axis and includes means operative in assembly to bias the enclosure generally rearward so that, pivoting about said axis, substantially the entire perimeter of the enclosure opening is urged rearwardly and downwardly against the insulating element.

* * * * *